May 14, 1963 R. L. SWINDLER 3,089,408
APPARATUS FOR PRESSING GLASS-PLASTIC ASSEMBLIES
Filed Jan. 10, 1958 10 Sheets-Sheet 1

INVENTOR.
Rollin L. Swindler
BY
Nobbe & Swope
ATTORNEYS

May 14, 1963 R. L. SWINDLER 3,089,408
APPARATUS FOR PRESSING GLASS-PLASTIC ASSEMBLIES
Filed Jan. 10, 1958 10 Sheets-Sheet 2

INVENTOR.
Rollin L. Swindler
BY
Hobbs & Swope
ATTORNEYS

May 14, 1963 R. L. SWINDLER 3,089,408
APPARATUS FOR PRESSING GLASS-PLASTIC ASSEMBLIES
Filed Jan. 10, 1958 10 Sheets-Sheet 4

Fig. 8

INVENTOR.
Rollin L. Swindler
BY
Nobbe & Swope
ATTORNEYS

May 14, 1963 R. L. SWINDLER 3,089,408
APPARATUS FOR PRESSING GLASS-PLASTIC ASSEMBLIES
Filed Jan. 10, 1958 10 Sheets-Sheet 5

INVENTOR.
Rollin L. Swindler
BY
Nobbe & Swope
ATTORNEYS

Fig. 19

INVENTOR.
Rollin L. Swindler
BY
Nobbe & Swope
ATTORNEYS

May 14, 1963 R. L. SWINDLER 3,089,408
APPARATUS FOR PRESSING GLASS-PLASTIC ASSEMBLIES
Filed Jan. 10, 1958 10 Sheets-Sheet 9

INVENTOR.
Rollin L. Swindler
BY
Nobbe & Swope
ATTORNEYS

United States Patent Office 3,089,408
Patented May 14, 1963

3,089,408
APPARATUS FOR PRESSING GLASS-PLASTIC ASSEMBLIES
Rollin L. Swindler, Ottawa, Ill., assignor to Libbey-Owens-Ford Glass Company, Toledo, Ohio, a corporation of Ohio
Filed Jan. 10, 1958, Ser. No. 708,194
4 Claims. (Cl. 100—49)

This invention relates broadly to the production of laminated safety glass, and more particularly is concerned with an improved aparatus for controlling the movement of curved glass sheets while the same are pressed together with an interlayer of plastic in a preliminary operation to the final sealing of the same by heat and pressure in an autoclave.

The principal object of this invention resides in an improved apparatus for pressing an assembled sandwhich of glass and plastic sheets, said apparatus having entry and discharge vertically swingably conveying means, between the opposed ends of which suitable pressing rolls are arranged, and with an improved arrangement of control elements adapted to influence movement of a glass-plastic sandwich as it is carried along a predetermined path of movement.

A second object is to provide an apparatus for pressing sandwiches of glass and plastic sheets wherein control means is provided to cause a glass-plastic sandwich to move along a predetermined, continuously changing path toward and away from pressing rolls located therein, and wherein a substantially fixed member is adapted to change the course of the said predetermined, continuously changing path of movement as said sandwich approaches the pressing rolls, whereby the lamination of flat glass sheets or bent glass sheets of various curvatures can be easily and rapidly effected.

Another object resides in the provision, in a pressing apparatus of the character described, of sequentially operating means which are adapted to control the action of entry and discharge, vertically swingable conveying means between the opposed ends of which suitable pressing rolls are arranged with means for guiding a glass-plastic sandwich from the entry conveying means to the pressing rolls and said means being adapted to cause the said pressing rolls to then swing about a common substantially horizontally disposed axis to locate the sandwich passing therebetween in suitable position for subsequent deposition upon the said discharge conveying means.

Another object resides in the provision in a pressing apparatus of the character described, of a variable and sequentially operating control means for governing the arcuately swinging movement of a pair of pressing rolls about a common horizontal axis, said control means being adapted to interrelate the swinging actions of the entry and discharge conveyors and said pressing rolls according to the curvature of bent glass sheets passing therethrough from an entry conveying means to the discharge conveying means of the pressing apparatus.

A still further object of the invention resides in the provision of a control member for each of an entry and discharge conveying means for a curved glass-plastic sandwich between the inner opposed ends of which a plurality of pressing rolls are supported in axial parallelism and tangential contact, of a guiding means adapted to adjustment to guide bent glass sheets of various curvatures from the entry conveying means to said pressing rolls, of means for operatively driving each of the said conveying means and the pressing rolls at a generally common rate of speed, and of an interrelated control means for causing the pressing rolls to rotate about a common axis in timed relation to movement of the glass-plastic sandwich therebetween, said guiding means and said several control means being adapted to be readily changed to accommodate the pressing apparatus generally for the pressing of flat glass sheets and/or bent glass sheets of cylindrical or complex curvature.

Other objects and advantages of the invention will become more apparent during the course of the following description when read in connection with the acompanying drawings.

In the drawings wherein like numerals are employed to designate like parts throughout the same.

Figures 1, 2, 3:
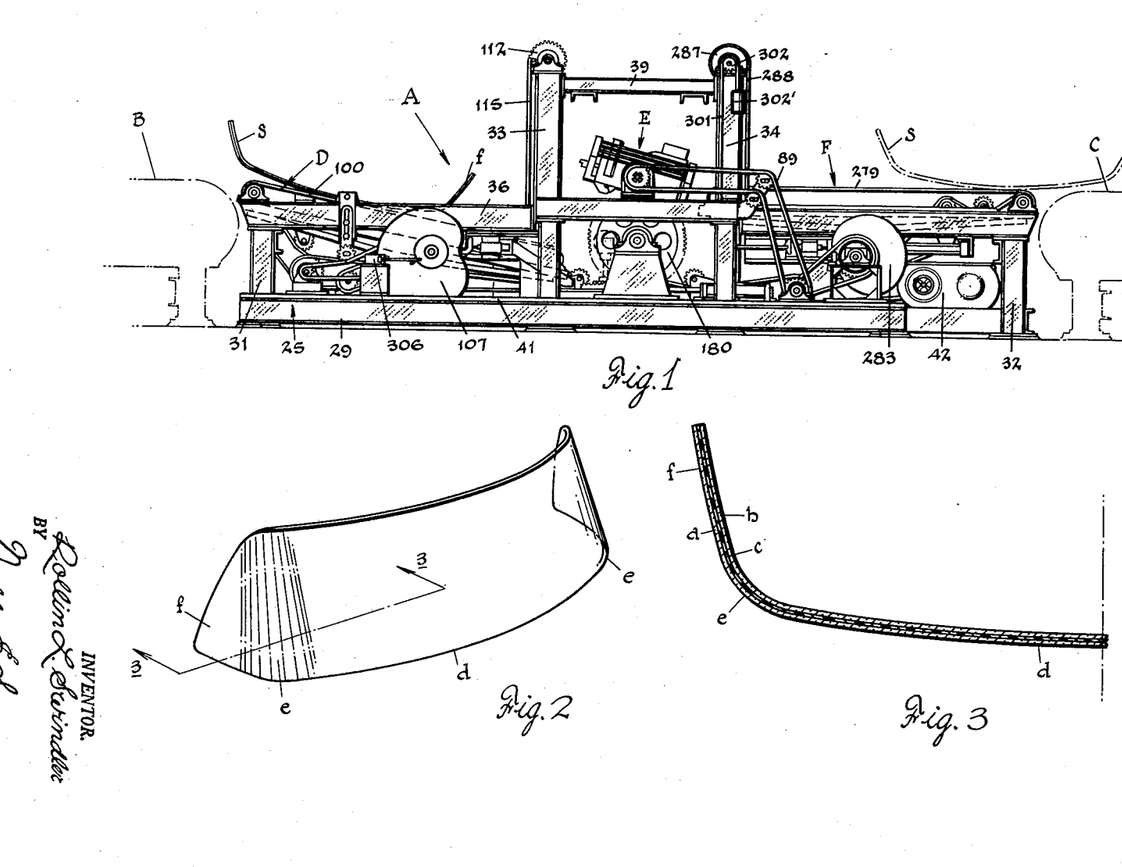
FIG. 1 is a side elevational view of a pressing apparatus constructed in accordance with the invention.
FIG. 2 is a perspective view of an automobile windshield as formed according to the method of this invention.
FIG. 3 is a half cross-sectional view of the wind-shield as taken substantially on line 3—3 of FIG. 2.

Referring now more particularly to the drawings, there is shown in FIG. 1 a pressing apparatus, generally designated by the letter A, constructed and operatively controlled in accordance with the present invention. Briefly stated, the pressing apparatus A is situated between a delivery conveyor B and a discharge conveyor C in which position it is adapted to receive glass-plastic assemblies or sandwiches S from the conveyor B and, after subjecting the sandwich to a pressing operation, deliver the same to the conveyor C for subsequently occurring operations.

As is well known, laminated safety glass is initially made up of two or more sheets or plates of glass and one or more plies of nonbrittle thermoplastic interposed therebetween. This preparatory assembly or sandwich is ultimately formed into a transparent, unitary structure under the influence of heat and pressure and for this purpose the several layers are initially subjected in one or more pressing operations between which they may be heated. The sequentially occurring phases of pressing and heating serve importantly to expel entrained air and moisture from between the several layers and, while the plastic layer is softened, to more intimately secure the respective surfaces into positive contact. This is especially true about the perimeter edge of the sandwich to insure against entry of objectionable, heated oil during the final pressing or autoclave operation.

The General Operation

The curved glass sheets $a$ and $b$ (FIG. 3) are carried on the conveyor B through an assembly area in which a plastic sheet $c$ is placed therebetween. As the then-assembled sandwich S is carried into the pressing apparatus A, it is received on an entry conveyor D and directively guided into a frame E wherein operatively-mounted pressing rolls are contained. From the frame E, the sandwich S is received on a take-off conveyor F which carries it to the discharge conveyor C. During passage of the sandwich between the pressing rolls of the frame E, the initial expelling of the air is produced but since the laminated safety glass for the windshields of present-day automobiles has been complexly bent, such passage must be carried out in such a manner that the sandwich is substantially never unsupported and is progressively subjected to pressure in a plane that is normal to its surfaces.

A windshield of this character is illustrated in FIGS. 2 and 3 wherein it will be seen that the structure provides a wide-expense or area for forward vision with rearwardly directed wings or end areas for more full and unobstructed vision. As viewed in FIG. 3, such a windshield, and which is symmetrical on each side of the indicated center, has a wide central area $d$ of substantially shallow curvature which through sharply curved corner areas $e$ blends into the end wing sections $f$. It will therefore be appreciated that in order to press the continuously curved and several surfaces $d$, $e$ and $f$ of the sandwich S and/or the windshield, care must be exercised to maintain the influence of pressure at all times normal to the immediately affected area. For this purpose, it is herein contemplated, and as will be more fully hereinafter described, to automatically coordinate and control the operative motions of the entry conveyor D, the pressing-roll frame E and the take-off conveyor F in a cyclically timed arrangement to the end that in a production flow of laminated sandwiches, each will be satisfactorily prepressed and in an identically automatic manner.

The Structure of the Apparatus

Figures 5, 6, 7:
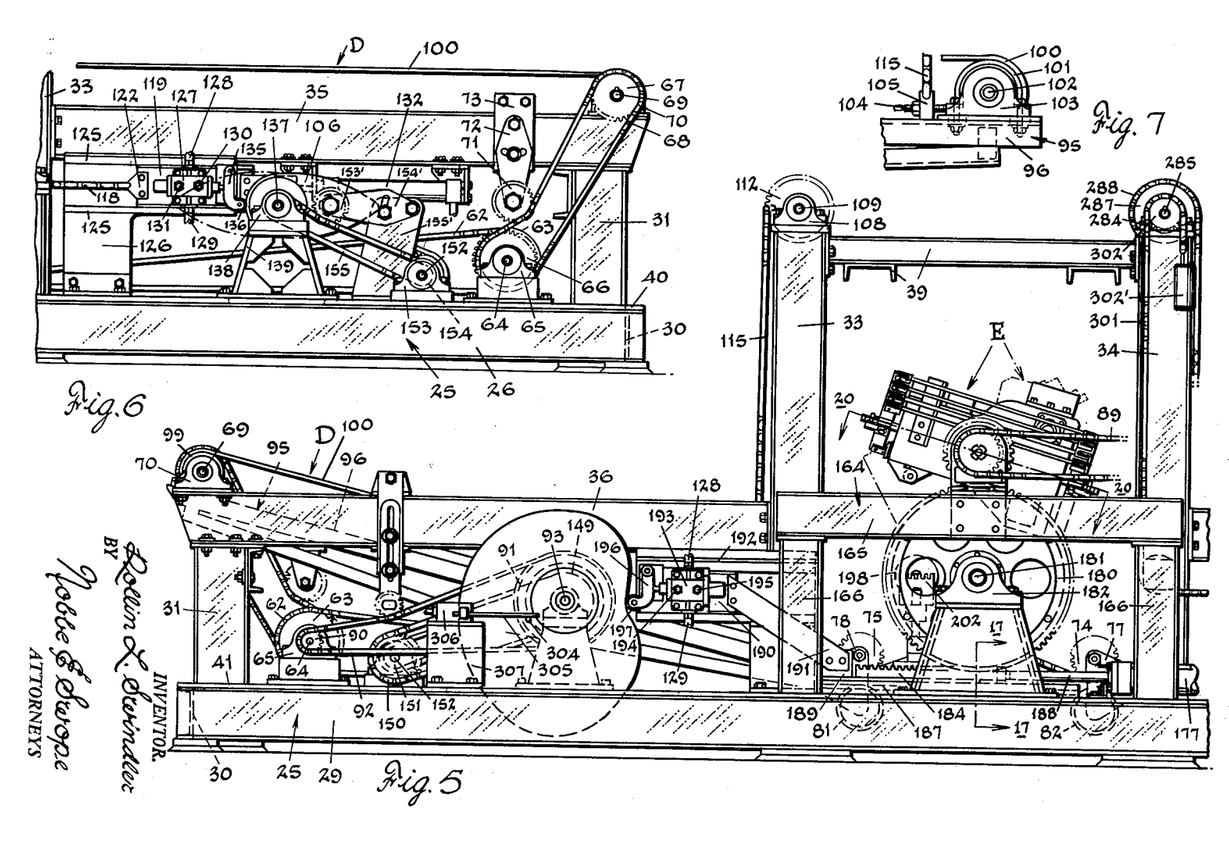
FIG. 5 is a side elevational view of the entry end of the apparatus.
FIG. 6 is a partial side elevational view of the entry end as viewed from the opposite side.
FIG. 7 is a fragmentary end view of the entry conveyor of the apparatus.
Figure 8:
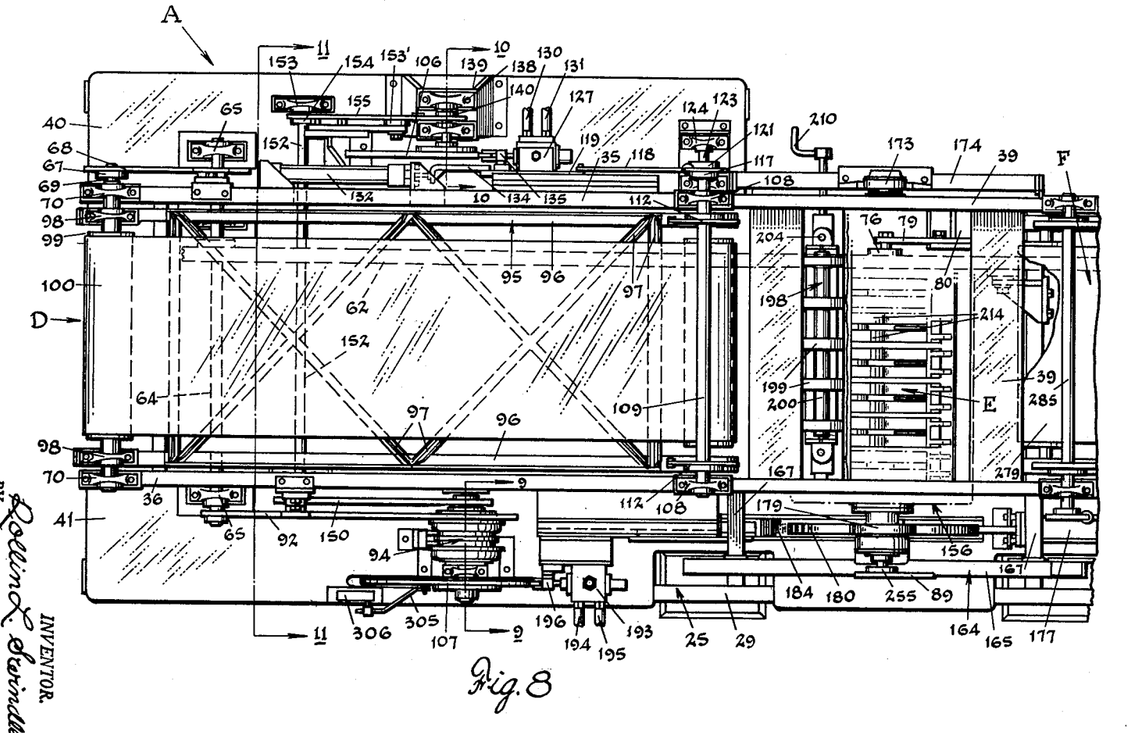
FIG. 8 is a plan view of the entry end of the apparatus.

Referring to FIGS. 1, 5 and 8, it will be seen that the apparatus A structurally comprises a framework generally designated by the numeral 25 and which includes a base formed by several longitudinally arranged channels 26, 27, 28 and 29 that are interjoined by transversely disposed channels 30. Affixed at one end of channels 27—28 is a pair of vertically disposed channels or pedestals 31 while at the opposite ends of channels 27—28 a pair of pedestals 32 are mounted. Medically therebetween, pairs of vertically disposed channels or columns 33 and 34 are suitably spaced from one another and generally from the vertical transverse axis of the frame 25.

The upper end of each pedestal 31 carries the outer end of horizontally disposed channels or beams 35 and 36 which at their opposite ends are attached to an aligned column 33. Likewise, at the opposite ends of channels 27—28, the pair of pedestals 32 are adapted to carry the outer end of beams 37 and 38. At their inner or opposite ends, beams 37—38 are structurally connected to aligned columns of the pair 34.

The pairs of columns 33 and 34 are interconnected at their respective upper ends by longitudinally and transversely arranged pairs of channels or braces 39. Obviously the various parts of the frame 25 can be further interconnected in a conventional manner and the several operating elements to be hereinafter more fully described may be covered by suitable safety housings although not herein specifically shown.

In order to provide adequate support for the above-mentioned operating elements, suitably positioned floors or platforms are carried by the longitudinally disposed channels 26 to 29 inclusive. Thus such a platform as indicated at 40 is supported by channels 26—27 and generally spans the distance between the adjacent pedestal 31 and column 33. Arranged along the opposite side of framework 25, platform 41 is carried by channels 28—29 and extends generally from adjacent pedestal 31 to a point between column 34 and aligned pedestal 32.

The Source of Power

Figure 14:
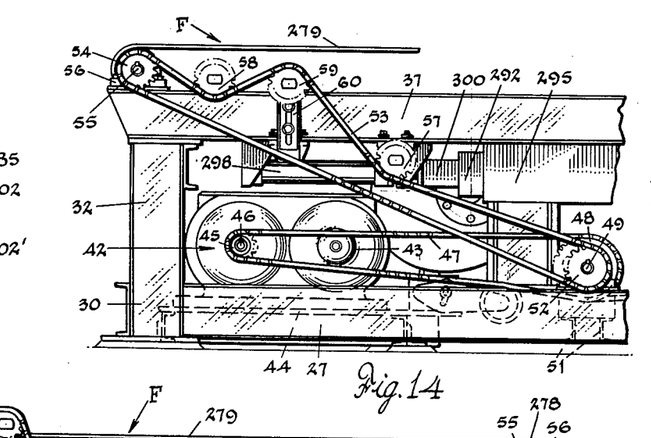
FIG. 14 is a partial side elevational view of the discharge end as viewed from the opposite side.
Figure 15:
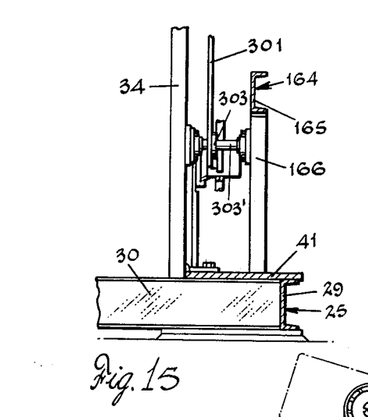
FIG. 15 is a vertical transverse sectional view taken on line 15—15 of FIG. 13.

Primarily, the functional elements of the pressing apparatus A are driven from a variable speed reduction unit 42, equipped with an electric motor 43 and carried on a base 44 structurally carried by channels 27—28. By means of a double sprocket 45 on the output shaft 46 of unit 42, a double roller chain 47 is adapted to drive a related double sprocket 48 on shaft 49 journaled in bearings 50 supported on platform 41 and transversely disposed channels 51 of the frame 25. While the shaft 49 mounts other sprockets, it carries a sprocket 52 at one end thereof about which a roller chain 53 is entrained to drive sprocket 54 on a shaft 55, journaled in bearings 56 mounted on the ends of beams 37—38 adjacent pedestals 32. Preferably, as in FIG. 14, the drive chain 53 is passed about substantially fixedly mounted idler sprockets 57 and 58 and over an interposed tensioning sprocket 59 journaled on a contained bearing and adjustably mounted by bracket 60 on beam 37.

Figures 4, 12:
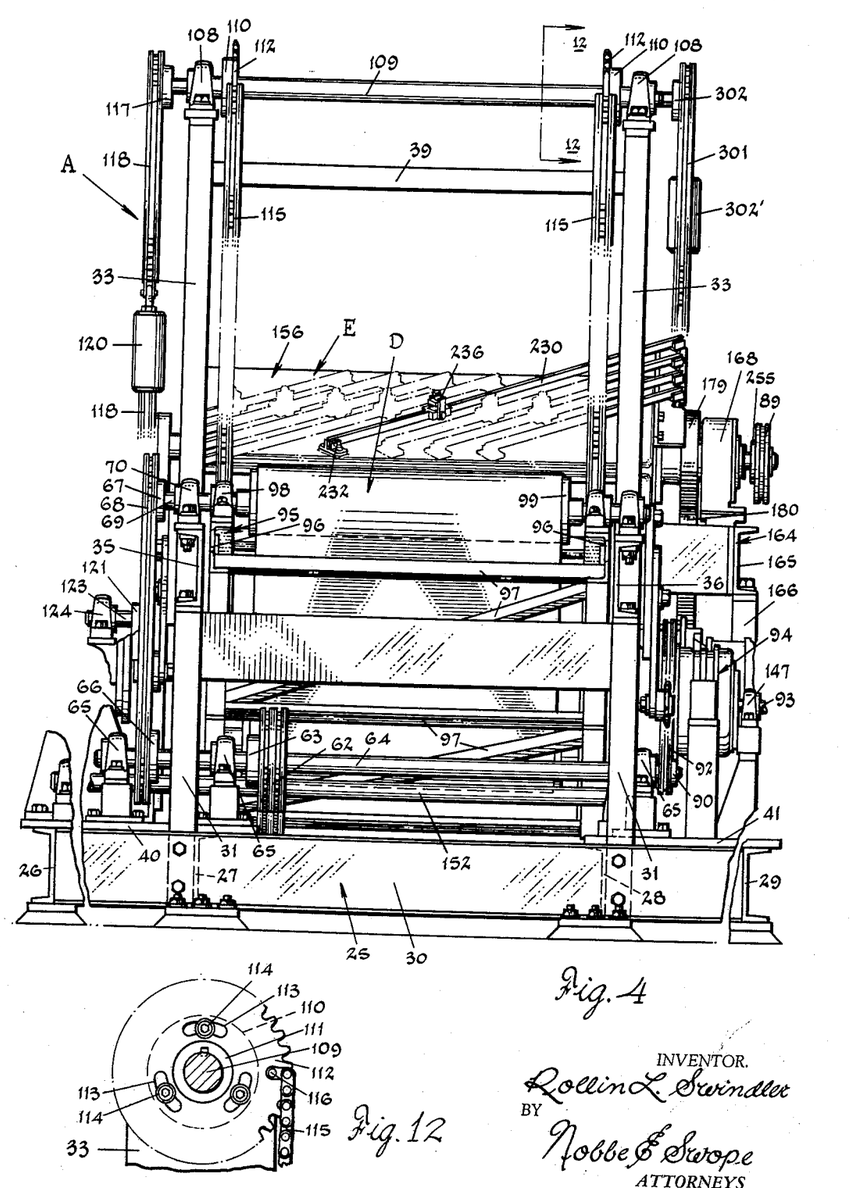
FIG. 4 is an elevational view of the entry end of the pressing apparatus.
FIG. 12 is a detail view of the conveyor lifting means as taken on line 12—12 of FIG. 4.

Shaft 49, by means of double sprocket 61 keyed thereto, drives a double roller chain 62 (FIG. 16) that are oppositely entrained about a double sprocket 63 on shaft 64 (FIG. 4). This shaft is located transversely adjacent pedestals 31 and is journaled in bearings 65 mounted on the platforms 40—41 of the frame 25. Shaft 64 at one end mounts a sprocket 66 which is coupled to sprocket 67 by means of roller chain 68, the sprocket 67 being fixedly carried on shaft 69 journaled in bearings 70 mounted at at the outer ends of beams 35—36. Sprocket chain 68 may be tensioned by means of an idler sprocket 71 suitably journaled on the adjustably positioned arm 72 of a bracket 73 carried by the frame beam 35 (FIG. 6).

Figure 13:
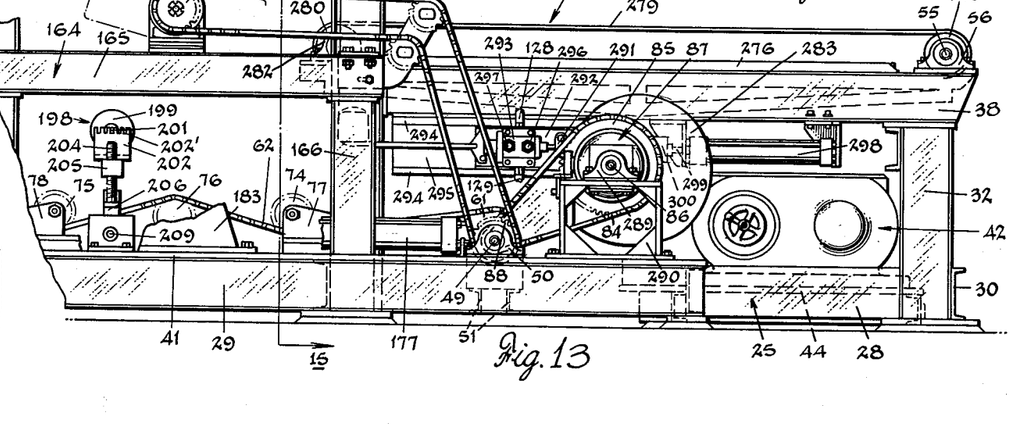
FIG. 13 is a side elevational view of the central area and discharge end of the pressing apparatus.

As shown in FIG. 13, one flight of each chain 62 is trained under idler double sprockets 74 and 75 and over an interposed tensioning double sprocket 76. The sprockets 74—75 are suitably journaled on brackets 77 and 78 on transversely disposed channels 30 while sprocket 76 is journaled on an adjustably positioned arm 79 of bracket 80 (FIG. 8) that is carried by an adjacent channel 27. The brackets 77—78 are also adapted to rotatably support sprockets 81—82 which intermesh with and carry the lower flight of roller chain 62 between sprocket 61 on shaft 49 and sprocket 63 on shaft 64.

The shaft 49, adjacent its end opposite the sprocket 52, fixedly carries a sprocket 83 which by roller chain 84 is coupled to a sprocket 85. As will be hereinafter more fully disclosed, the sprocket 85 is generally mounted on and is adapted to drive a shaft 86 by means of a magnetic clutch 87. Outwardly of sprocket 83, the shaft 49 fixedly carries a sprocket 88 which by roller chain 89 is adapted to operatively and continuously drive certain of the so-called pressing rolls in the frame E which will be further described hereinafter. In a like manner, shaft 64, at the entry end of the apparatus, carries a sprocket 90 coupled to a sprocket 91 by the roller chain 92 trained thereabout. The sprocket 91, similarly to sprocket 85, is adapted to drive a related shaft 93 (FIG. 9) through the medium of an associated magnetic clutch 94.

The shafts 49 and 64 accordingly are operatively connected to the power unit 42 and, as above described, to shafts 55 and 69 as well as to the magnetic clutches 87 and 94 respectively. The shafts 55 and 69 are thus disposed respectively at the opposite ends of the apparatus A and each is adapted to perform dual functions which include transmission of an operative source of power for the entry and discharge conveyors D and F and simultaneously serve as support elements therefor.

*The Entry Conveyor*

As best seen in FIGS. 4, 5, 7 and 9, the entry conveyor D comprises a framework 95 having side rails 96 interjoined by transversely and angularly disposed braces 97. The frame 95, at one or the outwardly disposed end, is equipped with bearings 98 that are rotatably mounted on the shaft 69 and thus support the frame for swingably controlled motion. Between the bearings 98, a tubular drive roll 99 for an endless conveyor belt 100 is centrally mounted on and keyed to the said shaft. A complementary roll 101 for said conveyor belt 100 is mounted at the opposite end of the frame 95 and the ends of shaft 102 for belt roll 101 (FIG. 7) are journaled in bearings 103 that are mounted on side rails 96 and can be moved longitudinally therealong by means of screws 104 that are supported in posts 105 secured to said side rails. The screws 104 may be employed to suitably adjust the tautness of the belt 100 upon movement of bearings 103. Since drive roll 99 is affixedly mounted on the shaft 69, which is driven by the sprocket 67 from chain 68, the conveyor belt 100 for entry conveyor D will be operatively driven by the same shaft on which the conveyor is bodily mounted by bearings 98 for controlled swingable movement.

These movements of conveyor D are coordinated to the functioning of the press-roll frame E by means of a timing arrangement governed by the simultaneously occurring rotation of a pair of cam members generally designated 106 and 107. As will be more specifically set forth, cam 106 controls the swinging movements of the entry conveyor D. Presently it may be said that each cam is operatively driven in one way or another from the previously described shaft 64.

In order to suitably swing the entry conveyor D during the pressing of a sandwich or glass-plastic sheet assembly, means herein provided to mechanically interconnect the cam 106 and the conveyor D and especially the inwardly disposed end thereof. More especially, the columns 33 at their upper ends support bearings 108 in which a shaft 109 is journaled. Equally spaced inwardly from bearings 108, annular disks 110 are keyed to shaft 109 at their hub portions 111 (FIG. 12). The disks serve as mounting plates for sprockets 112 that are equipped with arcuate and radially spaced slots 113 through which screws 114 are passed and threaded into the disks 110. Each sprocket 112 has a roller chain 115 fixedly attached thereto by pin 116 and so as to be entrained at one position of the conveyor D, about substantially three-quarters of its toothed periphery. Otherwise, and as is shown in FIG. 12, the roller chain 115 is attached at the pin 116 to said sprocket and depends therefrom to the conveyor D when disposed in its lowermost angular position (FIG. 5). Each chain 115 at its lower end is connected to the conveyor frame 95 by the posts 105 adjacent bearings 103 (FIG. 7).

By means of the slots 113 in sprockets 112, said sprockets can be rotated relative to their mounting disks 110 and in this manner equalize the transverse balance of the entry conveyor D generally. That is to say—upon loosening of the screws 114, one or the other of the sprockets 112 can be radially adjusted to bring about a related transverse and horizontal balancing of the side rails 96 of frame 95. Also since the roller chains 115 are entrained about the sprockets 112, rotation of shaft 109 on which they are generally mounted will effect winding or unwinding of the chains relative to the sprockets and consequently the conveyor will be caused to swing upwardly and downwardly about the axis of the shaft 69 on which it is bodily supported.

The shaft 109, at its end substantially above the cam 106, carries a sprocket 117 about which is trained a roller chain 118. This chain is connected at one end to a slide plate 119 while the other or pendant end has a weight 120 attached thereto. By means of a sprocket 121, the chain 118 has a substantially vertically disposed flight between the sprockets 117 and 121 and a horizontally disposed flight between sprocket 121 and its attaching clip 122 to the plate 119. The sprocket 121 is mounted on shaft 123 which is journaled in bearings 124 which in one way or another are mounted on structural components of the framework 25.

Figures 9, 10, 11:
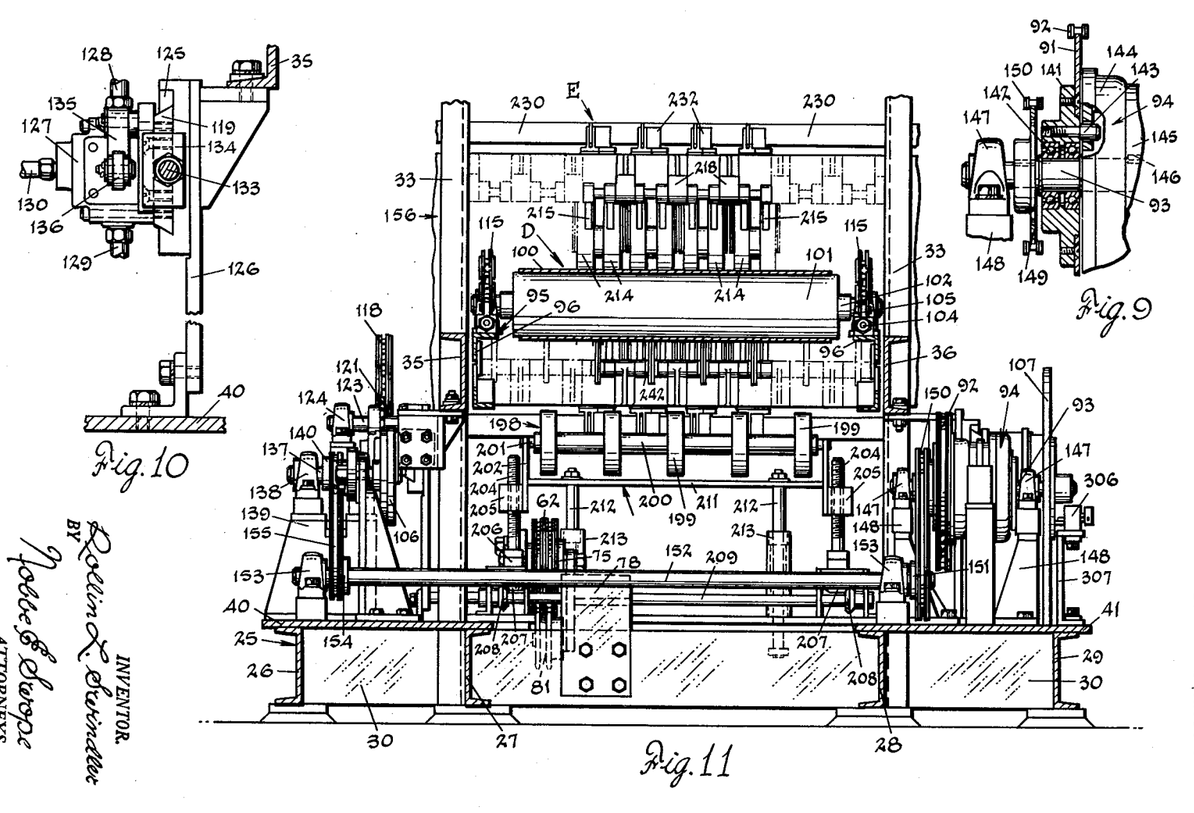
FIG. 9 is a vertical transverse view as taken on line 9—9 of FIG. 8.
FIG. 10 is a vertical transverse detail view as taken on line 10—10 of FIG. 8.
FIG. 11 is a vertical transverse detail view as taken on line 11—11 of FIG. 8.
Figures 16, 17, 18, 27:
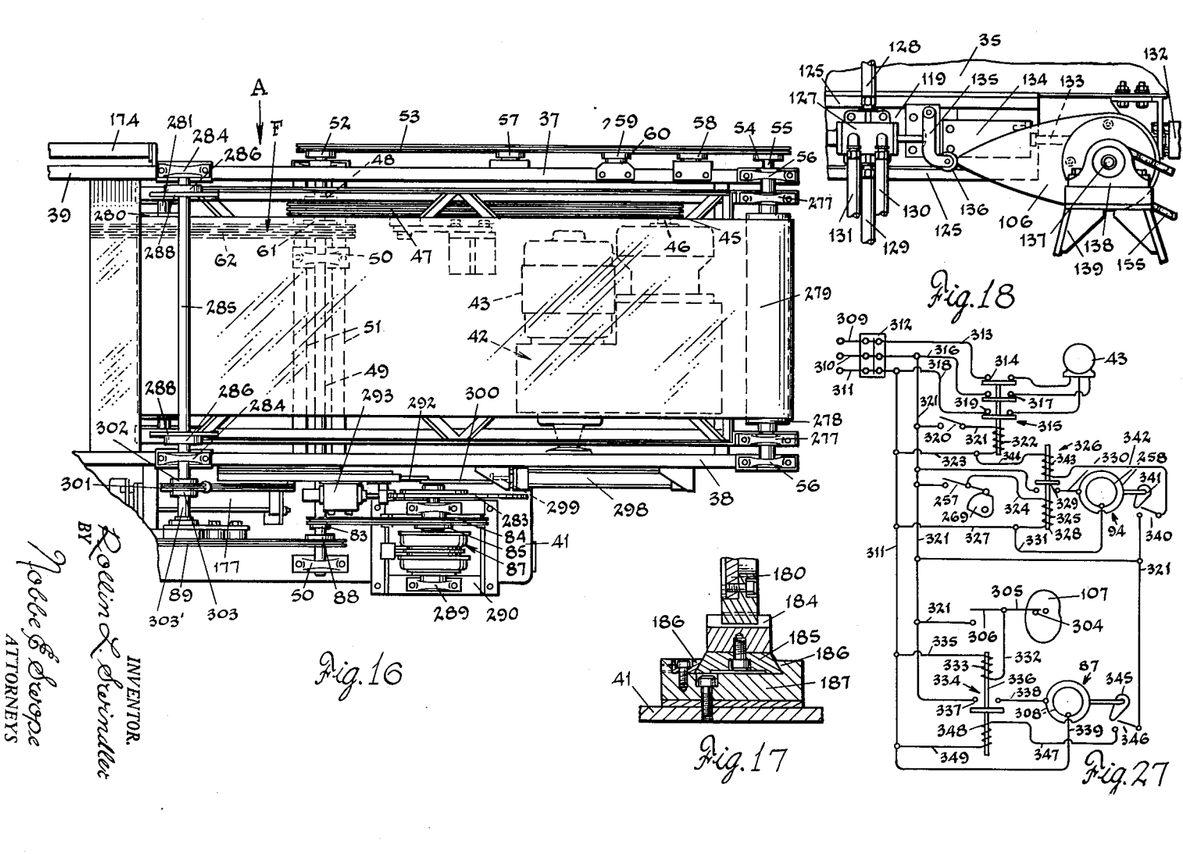
FIG. 16 is a plan view of the discharge end of the apparatus.
FIG. 17 is a cross-sectional detail view as taken on line 17—17 of FIG. 5.
FIG. 18 is a fragmentary elevational view of one of the control members.
FIG. 27 is a diagrammatic view of the electrical control circuit used in connection with the pressing apparatus.

As probably best seen in FIGS. 6, 8 and 10, the slide plate 119 is mounted between gibs 125 that form a part of the bracket 126 for the said plate. On its outwardly directed surface, the plate 119 supports a valve 127 having conventional supply and return conduits 128 and 129 and conduits 130 and 131 by which the valve is connected to the opposite ends of a cylinder 132 suitably mounted on the adjacent beam or channel 35. The piston rod 133 of cylinder 132 is connected to the slide plate 119 by means of an L-shaped link 134 and accordingly when pressure is directed to the forward end of the cylinder, as through conduit 130, the piston rod 133 and link 134 cause the slide plate 119 to move to a position as shown in FIG. 6. And by this operation the entry conveyor D is swung upwardly from the position of FIG. 5. Consequently as the valve 127 is actuated, the pressure from conduit 128 will first be directed through conduit 130 and then through conduit 131. This will cause the plate 119 to move first rightward to the position of FIG. 6 and then leftward to a rest position as shown in FIG. 18. In moving to the right, plate 119 draws upon the chain 118 to rotate the sprocket 117 and shaft 109; the sprockets 112 thereon turning to "wind-on" their respective chains 115 to lift the associated end of the conveyor D. Then as the said plate returns to the left, the weight 120 pulls on the chain 118 causing the sprocket 117 and shaft 109 to reverse their rotation and unwind the chains 115 from the sprockets 112 and lower the conveyor.

To accomplish the above-described reciprocal movement of the slide plate 119, the valve 127 is operatively associated with the cam 106 and by reason of its generated periphery, the connections between conduits 128 and 129 to conduits 130 and 131 are completed and reversed and the rate of opening and closing of the valve is controlled to determine the rate of motion of the entry conveyor. For this purpose, as best shown in FIG. 18, the plate 119 carries a pivotally mounted lever 135 having a roller 136 at its lower end and adapted to engage the surface of the cam 106. The cam 106 is fixedly mounted on a shaft 137 journaled in bearings 138 supported on a platform bracket 139 on platform 40. Shaft 137 also mounts a sprocket 140. The cam 106, in rotating counterclockwise, FIG. 6, from the broken line position to the full line position and thence to the original broken line position, produces the series of events which raises and subsequently lowers the entry conveyor D.

As mentioned above, rotation of cam 106 is simultaneous with that of cam 107 which produces rocking movements of the pressing frame E. For this purpose, the shaft 64, at its end opposite the sprocket 65, fixedly carries the sprocket 90 which by roller chain 92 is associated with the sprocket 91. This sprocket is rotatably mounted (FIG. 9) on the shaft 93 by means of a hub 141 having contained bearings 142. Hub 141 also carries a pin 143 by which the sprocket is mechanically related to the driver portion 144 of magnetic clutch 94. On the other hand, the driven portion 145 of said clutch is secured by key 146 to shaft 93 which by journal bearings 147 is rotatably mounted on platform brackets 148 on platform 41. Between the hub 141 and the adjacent bearing 147, shaft 93 mounts a keyed sprocket 149. As seen in FIG. 11, this sprocket is coupled by roller chain 150 to a sprocket 151 fixedly carried on shaft 152. The shaft 152 is journaled in bearings 153 mounted on platforms 40 and 41. At its opposite end, this shaft fixedly carries a sprocket 154 which by roller chain 155 is coupled to sprocket 140 on the shaft 137. Chain 155 may be maintained in tension by means of an idler sprocket 153' mounted on the adjustable arm 154' of bracket 155'. The cam 107 is mounted on shaft 93 outwardly of the clutch 94 and the adjacent bearing 147 and consequently when the driver and driven portions 144 and 145, respectively, of said clutch are engaged, the cam 107 and sprocket 149 will be rotated with shaft 93. Cam 106 will thus be simultaneously driven with the cam 107 through the train of chains 150 and 155 and sprockets 151 and 154 on shaft 152.

Now, in accordance with this invention, and while the cam 106 is causing the entry conveyor D to raise and fall during one full revolution, the cam 107 is similarly causing the pressing frame E to rock from the position substantially as illustrated in FIG. 5 to a position of generally opposite angularity and back again. However, the particular rate of speed of these rocking motions to be described by the frame E are predeterminately controlled by the generated peripheral surface of the cam 107. As herein discussed in connection with the windshield of FIG. 3, it was stated that the central area $d$ is of a relatively shallow curvature and through areas $e$ of rather sharp curvature bends outwardly into the end or wing areas $f$. And since it is the purpose of the invention to progressively control the pressing of a glass-plastic sandwich or assembly by forces that are directed against the glass surfaces in planes that are normal thereto, the generated peripheral surface of the cam 107 is determined by these several curvedly related surfaces of the assembly and the consequent rocking motion of the frame E, during at least one-half of the cam's rotation, will be timed in relation thereto as will be more fully described hereinafter.

*The Pressing Frame*

As best seen in FIGS. 20 to 26, inclusive, the frame E comprises a structurally integral body or housing 156, which is substantially rectangular and has open front and rear wall openings. At the left end in FIG. 20, this housing carries a fixedly mounted tubular shaft 157 while at its opposite end, it has a so-called "stub axle" 158 secured to the adjacent wall 159 therein. The shaft 157 is equipped at its inner end with a flange 160 that is bolted as at 161 to the wall 162 of the housing. Adjacent its outer end, tubular shaft 157 is journaled in a bearing 163 that is generally mounted on a superstructure 164. The superstructure is formed by a horizontally disposed channel 165 supported at its ends on pedestals 166 and connected to the adjacent vertical channels 33 and 34 by braces 167. If desired, although not necessarily, the bearing 163 may be contained in a block 168 pivotally mounted by a shank 169 in a fitting 170 connected to the channel 165.

The axle 158 at the opposite side of the frame housing 156 is equipped with a flanged end 171 that is bolted to the housing wall 159. Outwardly of flange 171, the axle is journaled in a bearing 172 contained in a block 173 that is mounted generally on a channel 174 that is structurally carried by flanges 175 on the adjacent and aligned channels 33 and 34. The block 173 may be adjustably mounted in a base 176 that is secured to the channel 174 whereby the said block can be shifted until the aligned axes of the shaft 157 and axle 158 are parallel with the transverse axis of the apparatus A. By means of said shaft and axle, the housing is adapted to be swung about an axis that is transversely disposed relative to the longitudinal axis of the apparatus, and the predetermined path of movement of a glass-plastic assembly therethrough. This rocking or swinging movement is produced by the cam 107 and is carried out by means of a gear train and through the operation of a cylinder 177.

More particularly, the shaft 157 between the flange 160 and the block 168 is equipped with a flange 178 on which is concentrically mounted a ring spur gear 179. The gear 179 is meshed with a spur gear 180 of larger diameter which is keyed on a shaft 181 that is journaled in bearings 182 on platform bracket 183. In turn the gear 180 meshes with a rack gear 184 (FIG. 17) carried on a slide-bar 185. The slide-bar 185 is mounted for reciprocal movement between ways 186 generally formed in or secured to a base 187 that is carried by the platform 41. One end of the rack is operatively connected to the cylinder 177 as by the threaded outer end of the piston rod 188 thereof. At its opposite end, the slide-bar carries an L-shaped bracket 189. The slide-bar 185 is thus connected to a slide-plate 190 by a linking bar 191; the slide-plate 190 being operatably associated with the cam 107.

Accordingly, the plate 190 is slidably mounted in the ways of a bracket 192 supported on the platform 41 and on the outer surface carries a valve 193. The valve is provided with a supply conduit 128 and return 129 and is connected to cylinder 177 by flexible conduits 194 and 195. Mounted on the plate 190 and interposed between the plunger of the valve and the adjacent cam 107 is a lever 196 having a roller 197 rotatably supported in the lower end thereof. As previously described in connection with the cam 106 and valve 128, as the cam 107 is rotated, the generated surface thereof causes the lever 196 to actuate the valve plunger to effect a direction of pressure (either pneumatically or hydraulically) to either one end or the other of the cylinder 177. In turn, this causes the piston rod 188 to move the slide-bar 185 and rack gear 184 in one direction or the other to drive the spur gear 179 through the gear 180 and consequently rock the pressing frame.

The generated surface of the cam 107 obviously is developed according to the curvature of the glass-plastic sandwiches to be prepressed and for purposes of illustration the typical curvature of a windshield requires that the rocking motion imparted to the frame E will initially be slow; then accelerated; again slow then accelerated, followed by a final substantially slow rocking motion of the frame to a position substantially the same in angularity from the horizontal as the angular plane in which the frame is illustrated in FIG. 5, and finally to then rapidly rock the frame in the reverse direction. The initial angular position of the frame E is determined by the best angular plane in which the leading curved end $f$ of the glass-plastic assembly can be directed as it is moving forwardly and angularly downward on the belt 100 of the entry conveyor D. The angular plane along which the leading end $f$ moves is to some extent controlled by a guide roll 198 that is engaged by the said leading, upwardly curving end and thus directed into a path or plane generally tangential to the normally disposed horizontal axis of the pressing frame.

The guide roll 198 is thus located between the inner end of the entry conveyor D and the frame E as shown in FIG. 5 and, more particularly, comprises a plurality of rubber rollers 199 that are mounted on a tubular axle 200 (FIG. 11). The axle 200 is mounted for more or less free rotation on a support shaft 201 by means of contained bearings. This shaft is supported at its ends in the vertically disposed end walls 202 of a platform 203. The upper end of each wall 202 is equipped with notches 202' (FIG. 5) in which the flattened ends of the shaft 201 are located, the notches affording several positions of adjustment for the guide roll generally. The platform 203 is supported on vertically disposed threaded rods 204 which are received in threaded blocks 205 secured to the walls 202. These rods are rotatably supported in brackets 206 and are equipped at their lower ends with bevel gears 207. By means of the gears 207, the rods 204 are adapted to raise and lower the platform 203; gears 207 meshing with complementary bevel gears 208 on transversely and horizontally disposed shaft 209. This shaft is rotatably supported in the walls of the brackets 206 and at one end thereof is equipped with a crank or handle 210. The horizontally disposed web 211 of the platform 203 is provided with depending rods 212 slidably contained in fixedly mounted and vertically disposed sleeves 213 and operating to guide the vertical movements of said platform as produced by joint rotation of the threaded rods 204 and the resultant traversal therealong of the internally threaded blocks 205 on platform walls 202.

Since the guide roll 198 is adapted to be adjustably shifted in a horizontal plane by means of the various positionings of the flattened ends of rod 201 in the notches 202' and in the vertical plane by the raising or lowering of the platform 203, it will be apparent that the guide roll can be readily and accurately located to be engaged by the leading end of an advancing assembly according to the curvature therein. Consequently, when bent glass sheet-plastic assemblies having a differing curvature are to be prepressed in apparatus of the character herein described, adjustment in the positioning of the guide roll will compensate for such changes in curvature to the end that the leading end will be directed toward the pressing frame E along a plane parallel to the normally disposed horizontal axis thereof.

Figures 20, 21, 24:
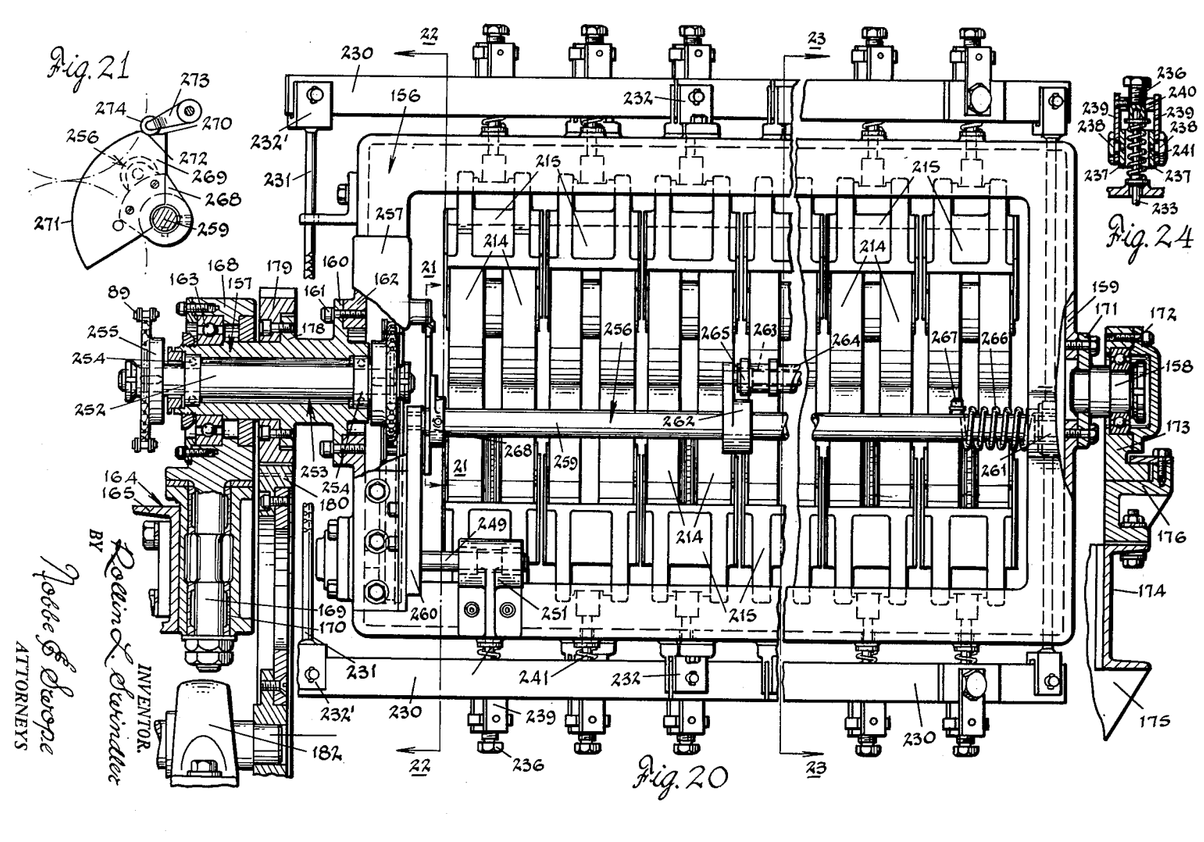
FIG. 20 is a vertical, transverse detail view as taken on line 20—20 of FIG. 5.
FIG. 21 is a detail view as taken on line 21—21 of FIG. 20.
FIG. 24 is a cross-sectional detail view of a balancing link connection of the pressing frame.

More particularly, the plane in which the leading end of a glass-plastic sandwich is moved is tangential to the peripheral surfaces of a pair of axially parallel rolls mounted in the housing 156 of the pressing frame E. These rolls are comprised of a plurality of pairs of rollers 214 which are substantially axially aligned and are each arranged in rolling contact with a vertically adjacent pair of rollers as shown in FIG. 20. Each pair of rollers 214 is journaled in a cradle 215 that is equipped with ears 216 by means of which it is pivotally carried by a rod 217 supported on the housing by brackets 218. As will be noted in FIG. 26, the rollers 214 include resilient rings 219 preferably vulcanized onto a hub 220. In the instance of the lower pairs of rollers, the hub is split to receive a sprocket 221 that is secured therebetween by screws 222. However, the hubs, generally, are provided with a bore 223 having counterbored end portions 224. By means of bearings 225 in counterbore 224, a shaft 226 is passed through the bore 223 and serves to rotatably support the rollers 214 and the ends of each shaft are tapped to receive mounting screws 227. The screws are supported outwardly of the shaft ends in collars 228 forming parts of plates 229 that are secured to the side surfaces of the cradles 215.

Thus, each pair of rollers 214 are mounted for substantially free rotation on their individual shafts and are adapted to be swingably separable from the oppositely disposed pair by means of the cradles 215 in which they are bodily carried. The rollers are freely rotatable to receive and pass the glass-plastic assembly therebetween while being carried by the cradles 215, and they are, in aligned pairs, capable of raising and falling from a common plane that is parallel to the rolls, formed collectively by the pairs of aligned rollers. The purpose for so supporting the cradles on the rods 217 is to permit the rollers to accommodate glass-plastic assemblies having a slight transverse or cross-bend therein. As viewed in FIG. 20, it will be seen that the pairs of rollers 214 are positioned to receive the thicknesses of glass and plastic sheets and to press the same together with sufficient pressure to exhaust entrained air therefrom and bring about the desired amount of adhesion of the plastic to the glass preparatory to the final pressing of the sandwich in an autoclave.

Figures 22, 23, 25, 26:
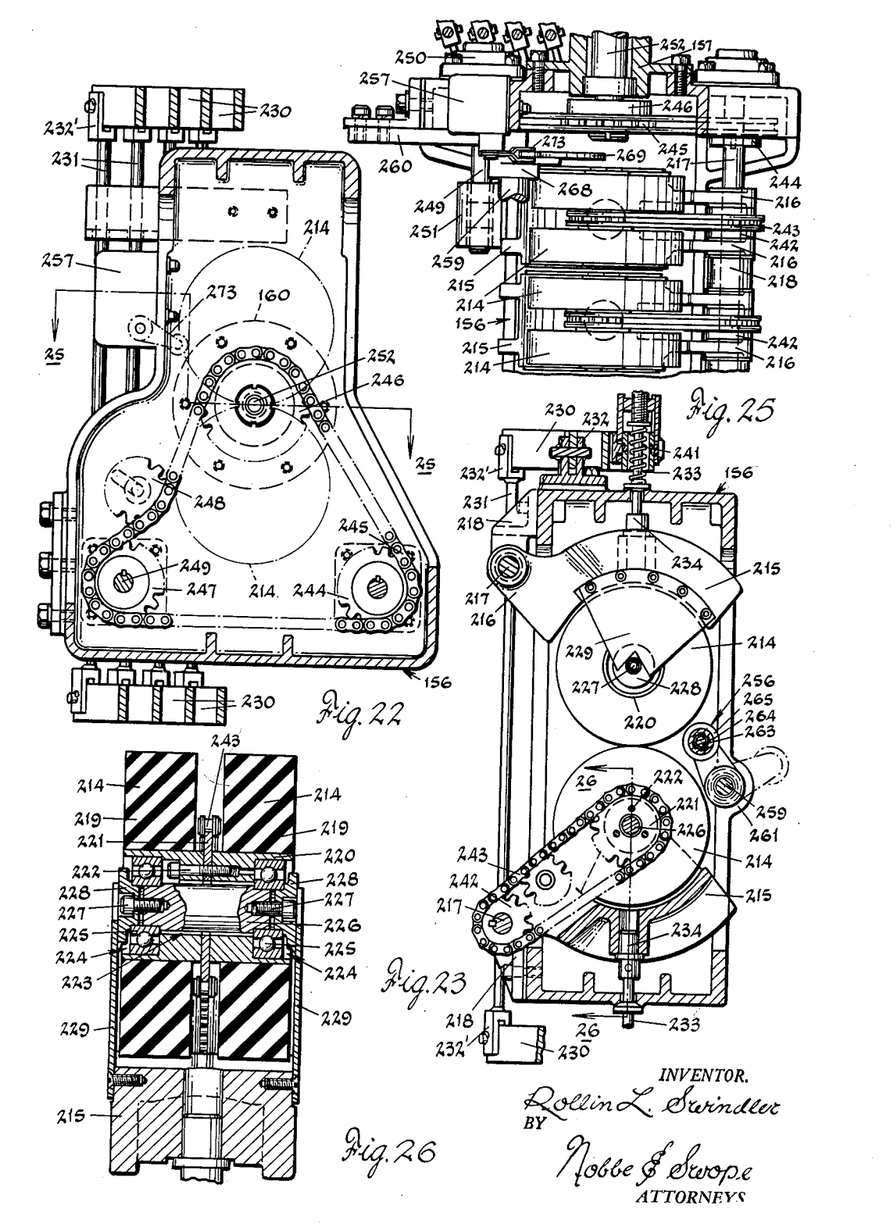
FIG. 22 is a side elevational detail view of the pressing roll frame partly in cross-section and as taken substantially on line 22—22 of FIG. 20.
FIG. 23 is a side elevational view of the opposite end of the pressing frame as taken on line 23—23 of FIG. 20.
FIG. 25 is a horizontal section view as taken on line 25—25 of FIG. 22.
FIG. 26 is a cross sectional detail view of a mounting assembly for the pressing rolls as taken on line 26—26 of FIG. 23.

In order to control the amplitude of pressure exerted by the aligned pairs of rollers 214 and cause the rollers of opposed pairs to follow one another in any raising or falling motion, the vertically aligned cradles 215 are interconnected by means of levers 230 which are interjoined by rods 231. More particularly, the levers 230 are pivotally mounted at their ends, opposite the rods 231, in brackets 232 that are secured to the respective upper and lower walls of the housing 156 (FIG. 23). The levers are thus arranged angularly across the said walls so that in pairs they are located to pass through the vertical axis of the cradles with which they are associated and to extend outwardly of the housing. The outer ends of each lever are connected by a pin to a clevis 232' integrally secured to the opposite ends of the rods 231.

As illustrated in FIGS. 23 and 24, the levers 230 and cradles 215 are each substantially flexibly connected by means of a rod 233 having a head 234 received in a socket 235 formed in a web between the side walls of the cradle. The outer end of each rod is slidably mounted in an externally threaded sleeve 236 generally carried by the lever 230. For this purpose, each lever is formed with an open area described by spaced plates 237. Each plate carries, by means of shoulder screws 238, vertically disposed bars 239 which are interjoined at their upper ends by a centrally tapped block 240. The sleeves 236 are threadably received in the blocks 240. Springs 241 are interposed between the ends of the sleeves 236 and the adjacent wall of the housing and are adapted to be compressed or relaxed by the said threaded sleeves which in turn varies the amount of force that the rollers 214 will exert upon the surfaces of the sandwich.

To progressively move the sandwich or glass-plastic assembly between the rollers 214, the lower pairs of rollers, as previously mentioned, are equipped with the sprockets 221. These are coupled to indiivdually related sprockets 242, fixedly mounted on the associated rod 217, by roller chains 243. As will be noted in FIGS. 22 and 25, the gears 242 are located between the ears 216 of each related cradle 215. The rod or drive shaft 217 at one end mounts a sprocket gear 244 about which is trained a roller chain 245 that is passed about a drive sprocket 246 and an idler sprocket 247. If desired, the tension of chain 245 can be controlled by an adjustably mounted sprocket 248. The sprocket 247 is fixedly mounted on a shaft 249 that is journaled at its ends in a bearing 250 mounted on the housing wall 162 and a bracket 251 while the sprocket 246 is fixedly keyed to the end of a shaft 252.

Referring now to FIG. 20, the shaft 252 is axially contained in the bore 253 of the tubular shaft 157 and supported in bearings 254 mounted in the counterbored ends thereof. At its outer end, shaft 252 fixedly carries a sprocket 255 and this sprocket is driven by the previously described sprocket 88 (FIG. 13) by means of roller chain 89. Since the sprocket 88 on shaft 49 is continuously operating, the chain 89 will drive sprockets 246 and 255 and shaft 252 on which they are mounted. These in turn and by chain 245 drive sprockets 242 and 244 and through chains 243, the sprockets 221 associated with lower pairs of rollers 214. Thus the tubular shaft 157, while serving to support one end of the housing 156, is also adapted to turn the same by the spur gear 179 in response to the movement of rack gear 184 and intervening gear 180 as well as rotatably support the shaft 252 driving the lowermost rolls.

Also mounted on the housing 156 is a control member generally designated 256 which is operatively connected through a switch 257 to the contacts 258 (FIG. 8) controlling the electromagnetic clutch 94. The member 256 includes a mounting rod 259 that is rotatably supported at one end in a plate 260 secured to the housing wall 162 and at its opposite end in a boss 261 integrally formed in the adjacent housing wall 159. Medially between these ends, the rod 259 fixedly carries a pair of arms 262 in the outer ends of which a shaft 263 is supported. The shaft 263, by means of contained bearings, carries a sleeve 264 having rubber rings 265 spaced therealong. The arms 262 are angularly positioned, as seen in FIG. 23, so that the sleeve 264 and rings 265 will be disposed above the plane tangential to the pairs of rollers 214; or, in other words, directly in the path of glass-plastic sandwich as it is moved between the said pairs of rollers. This causes the control member to be pivotally deflected to a position substantially as indicated in broken line of FIG. 23 and against the bias of a return coil spring 266. This encircles the rod 259 at its end adjoining the boss 261 with one end secured to the rod by a screw 267 (FIG. 20) and the other end anchored in a hole provided in the boss. Accordingly, when the member 256 is released from its outwardly swung position, the distorted condition of the spring causes it to return the control member to the position shown in full line.

At its end opposite the spring 266, the rod 259 has a mounting 268 for a switch actuator plate 269. As viewed in FIG. 21, the plate has two inter-related arcuate surfaces 270 and 271 of different radial length from the axis of the rod 259. The surface 270 constitutes a dwell area while the rise or cam surface 272 acts to lift the adjacent switch arm 273 by the roller 274 thereof and operate the switch 257 as the said roller traverses the arcuate surface 271. It may thus be said that an electric circuit will be completed through the switch to the clutch contacts 258 while a glass-plastic assembly is passing between the rollers 214 and the control member 259 is maintained in the broken line position of FIG. 23. However, as will be more fully hereinafter disclosed, the switch 257 initiates the cyclic operation of the cams 106 and 107 by means of the clutch 94 the circuit to which is opened when the cams have completed one full revolution.

The cam 107 thus produces reciprocal movement of the slide-plate 190 by means of the cylinder 177 and through its control of the valve 193. The slide-plate 190, in moving to the right as viewed in FIG. 5, actuates the rack gear 184 whereby the gear 180 will be driven to revolve the gear 179 and consequently swing or rock the housing 156 of the pressing frame E. As previously described, the periphery of the cam 107, in the present disclosure and by way of example, is developed to rock the frame E at a desired constant rate of movement while an assembly S, and particularly the leading end $f$ thereof, is passing between the pairs of rollers 214; to then accelerate the rocking motion when a sharply curved area $e$ is passed between the rollers and to then decelerate the motion in the central area of shallow curvature. According to this present modus operandi, the pressing frame E in its vertical axis passes through a perpendicular plane substantially simultaneously with passage of the central area of the assembly between the rollers.

As the opposite sharply curved area $e$ approaches the pressing area of the rollers 214, the cam produces a second accelerated rate of motion followed by a decelerated motion as the trailing end $f$ is pressed. The frame completes its rocking motion in a position substantially as indicated in broken line in FIG. 5 when the assembly S is supported on the take-off conveyor F and the trailing end $f$ passes from between the several pairs of rollers 214. The cam 107, in completing the remainder of one revolution, effects a reversal of movement of the gears 179, 180 and 184 to return the pressing frame E to its receiving position as indicated in full line. Obviously by changing the generated surface of the cam 107; by changing, if necessary, the angular position of the frame E and the closely associated position of the guide roller 198, the apparatus generally can be modified to accommodate bent glass sheet assemblies of any practical curvature. The cam 107 also carries means for initiating the controlled movement of the take-off conveyor F at the desired interval of its rotation so that during the final phase of pressing, the glass-plastic assembly at its leading end will be received by the endless belt of the conveyor F.

*The Take-Off Conveyor*

Figure 19:
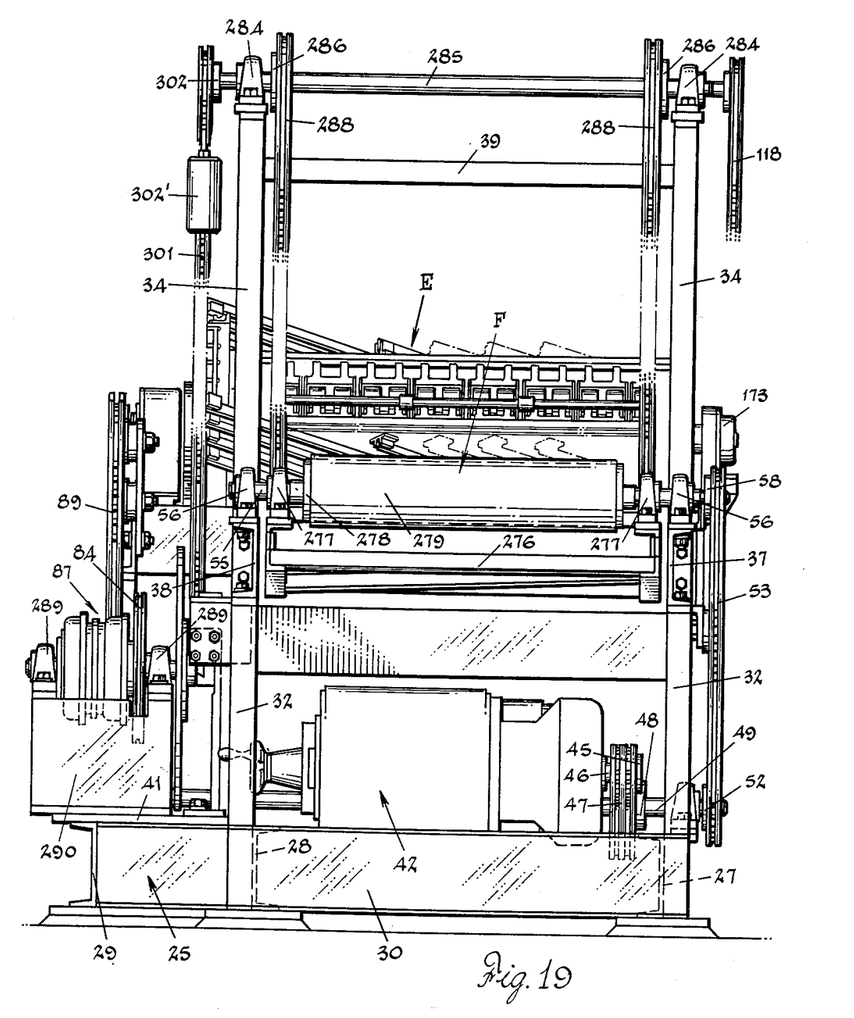
FIG. 19 is an elevational view of the discharge end of the pressing apparatus.

As best seen in FIGS. 13, 16 and 19, the take-off conveyor F comprises a framework 276 of substantially the same structure as the entry conveyor 95. This frame 276 at one end is equipped with bearings 277 that are rotatably mounted on the shaft 55 and thus support the frame for swingably controlled motion. Between the bearings 277, a tubular drive roll 278 for an endless conveyor belt 279 is centrally mounted on and keyed to the said shaft. A complementary roll 280 for said conveyor belt 279 is mounted at the opposite end of the frame 276 and the ends of shaft 281 for belt roll 280 are journaled in bearings 282 that are mounted on the side rails of the frame 276 and moved adjustably therealong, as shown in FIG. 7 in connection with the conveyor D, by means of screws that are supported in posts secured to said side rails. Since drive roll 278 is affixedly mounted on the shaft 55, which is driven by the sprocket 54 from chain 53, the conveyor belt 279 for take-off conveyor F will be operatively driven by the same shaft on which the conveyor is mounted by bearings 277 for controlled swingable movement. These movements of the take-off conveyor F are coordinated to the functioning of the press-roll frame E by means of a timing arrangement governed by the rotation of the cam 107.

To suitably swing the take-off conveyor F during the reception thereupon of a glass-plastic assembly, a cam 283 is herein provided which is adapted to operatively influence interconnections between the cam 283 and the conveyor F and more especially the inwardly disposed end thereof. Thus, as previously noted with reference to the columns 33, columns 34 at their upper ends support bearings 284 in which a shaft 285 is journaled. Equally spaced inwardly from bearings 284, annular disks 286 for sprockets 287 are keyed to shaft 285, the disks 286 serving as mounting plates for the sprockets substantially in the same manner, as shown in FIG. 12 wherein one of the sprockets 112 is illustrated, and are adjustable in the same manner. Each sprocket 287 has a roller chain 288 fixedly attached thereto and so as to be entrained, at one of the rest position of the conveyor F, about substantially three-quarters of its toothed periphery. Each chain 288 at its lower end is connected to the conveyor frame 276 as previously set forth.

As stated in an earlier portion of this specification, the shaft 49 carries the sprocket 83 which, by roller chain 84, is coupled to sprocket 85 on shaft 86. As viewed in FIG. 16, this shaft 86 is journaled in bearings 289, mounted on platform bracket 290 on platform 41, and is operatively connected to the driven portion of the electromagnetic clutch 87. On the other hand, the sprocket 85 is related with the driver portion of the clutch. Outwardly of one bearing 289, shaft 86 fixedly carries the cam 283.

The cam, by means of a lever 291 pivotally mounted on a slide-plate 292, is adapted to actuate a valve 293 adjacently mounted on said slide-plate. This slide-plate is reciprocally mounted by gib plates 294 on a bracket 295. The valve 293 by conduits 128 and 129 is connected to pressure and return sources while by conduits 296 and 297, it is associated with a cylinder 298 mounted on the channel or beam 38. The piston rod 299 of this cylinder is connected to the slide-plate 292 by means of an L-shaped link 300 and when pressure is directed to the rear end of the cylinder through conduit 296, the rod 299 and link 300 move the slide-plate 292 to the left, as viewed in FIG. 13. This action causes a roller chain 301 to rotate a sprocket 302 on an outer end of shaft 285 under the influence of a weight 302' on the pendant end of the chain. The chain 301, between the horizontally and vertically disposed flights thereof, is trained about an idler sprocket 303 on shaft 303'. Consequently, the shaft 285 is rotated so that the sprockets 287 thereon literally "unwind" the roller chains 288 thereby swinging the inner end of the conveyor F downwardly and this swinging action will be in timed relation to the rocking motion of the press-roll frame E. These related movements enable the take-off conveyor to start its downwardly swinging movement as the pressed glass-plastic assembly is to be moved onto the conveyor belt 279; to reach substantially the bottom of the downward swing as the frame E approaches the end of its rocking motion and to then swing upwardly as the assembly S is carried forwardly toward the discharge conveyor C.

*The Complete Pressing Operation*

As previously set forth, the novel embodiments of this invention enable the operation of a pressing apparatus for assemblies of curved glass sheets and a plastic interlayer to be carried out in an easily controlled manner. This makes it now possible to adequately support a bent sheet assembly of considerable length and varied curvature during its passage through such an apparatus to the end that the actual application of pressure can be attained in directions normal to the surfaces of the sheets and the assembly can be guided into and removed from the pressing area in a satisfactory manner. Thus, the entry conveyor D is initially disposed in an inward and downwardly inclined position to carry an assembly forwardly along a predetermined path and so that the leading end thereof will properly engage the guide roll 198 to direct the said end angularly upward along the plane tangential to the peripheries of the pairs of rollers 214.

When the end passes between these rollers and the pressing operation is started, the driven lower pairs of rollers act to progressively move the assembly through the pressing area and into active engagement with the control member 256. The member 256 against spring 266 closes switch 257 and this completes a circuit to contacts 258 to energize magnetic clutch 94. Now with the sprocket 91 driving the cam 107 and sprocket 149 by shaft 93, the cam 106 will be simultaneously operated. Consequently, the pressing frame E will be rocked through the train of gears 179, 180 and 184 to continuously maintain the vertical plane through the parallel axes of the rollers 214 substantially perpendicular or normal to the immediate area of the curved glass surfaces affected by the pressure of the rollers. Expressed in other words, the frame E will be rocked at a progressively varied rate of speed complementary to the changing curvature and to maintain the affected area in a plane tangential to the rollers. Now, as the cam 106 is rotated, as previously set forth, the sprockets 112 on shaft 109 are rotated to "wind" on the related chains 115 and thereby raise the inner end of the conveyor D. The rate of this upward movement is proportionately related to the rocking motion of the frame E in order that the trailing end of the assembly on the belt 100 will be suitably elevated to agree with the angular position of the forward end of the assembly engaged between the pairs of rollers 214.

As the pressing-roll frame E is rocked through an axially aligned, perpendicularly disposed plane, the cam 107 becomes instrumental in activating the magnetic clutch 87 and thereby initiate the downwardly swinging motion of the take-off conveyor F. For this purpose, the cam 107 on its outwardly disposed surface is provided with a pin 304. The pin, in being carried in a radial path, acts to lift or swing a lever 305 for switch 306 upwardly and the radial position of the pin from the axis of the shaft 93 together with the length of the lever beyond the pin will determine the delay interval between the start of rotation of cams 106 and 107 and similar rotation of the cam 283. The switch 306, as shown in FIG. 5, may be mounted by a bracket 307 on platform 41 and is adapted to complete a circuit to the contacts 308 of the clutch 87. Accordingly, by control of the cams 106 and 107, the entry conveyor D will be caused to swing upwardly; the frame E will be rocked forwardly and the take-off conveyor F will then start its downward swinging motion; then, as the frame E is rocked rearwardly and the entry conveyor is allowed to again swing downwardly, the take-off conveyor F will have bodily received the pressed assembly S and will be caused to swing upwardly in a motion continuing after the conveyor D and frame E have stopped.

In order that these sequentially occurring phases of the pressing operation can be efficiently carried out, a circuitry such as is shown in FIG. 27 may be employed. Thus, from source lines 309, 310 and 311, circuits may be completed through a switch 312. Conventionally, line 309 is connected by line 313 through closed contacts 314 of a relay switch 315 to the motor 43; line 310 by line 316 through closed contacts 317 to the motor and the line 311 to the motor by line 318 through closed contacts 319 of the said switch. The several motor lines may be broken by means of a switch 320 connecting line 321 from source 310 to the coil 322 and thence to source 311 by line 323. Halting of the motor 43 will, of course, terminate all operating elements of the pressing apparatus.

However, in continuous operation and when the switch 257 is closed by rotation of the plate 269, the line 321 will be completed by line 324 to coil 325 of a relay switch 326 and thence to line 311 by line 327 and whereby the armature 328 will close contacts 329. This will complete a circuit to the electromagnetic clutch 94 from source line 321 through line 330 to contacts 258 and thence by line 331 to the source 311. The cams 106 and 107, as above described, will now be operatively rotated and the entry conveyor D will be swung upwardly as the pressing-roll frame E is swung forwardly. Substantially as the vertical axis of the frame passes beyond a perpendicular plane, the pin 304 on cam 107 will release the lever 305 to actuate switch 306 to momentarily complete a circuit from source line 321 by line 332 to coil 333 of a relay switch 334 and to source 311 by line 335. This will move armature 336 to close contacts 337 to complete a circuit to the electromagnetic clutch 87 from source line 321 by line 338 to contacts 308 and thence by line 339 to source 311. Thus, while the entry conveyor D reaches the upper limit of its swinging motion, as determined by the cam 106, and the pressing-roll frame E approaches at the limit of its forward rocking motion, as determined by the cam 107, the take-off conveyor F will start swinging downwardly to receive the pressed glass-plastic assembly thereupon since the cam 283 will now be driven by the clutch 87.

The generated surfaces of the cams 106 and 107 now cause the downward movement of the conveyor D and a simultaneous and substantially rapid rearward motion of the frame E. As the cams approach the completion of one full revolution, a suitable switch 340 from source line 321 is adapted to be closed as by a cam 341 and thereby complete a circuit by line 342 to the coil 343 of relay switch 326 and by return line 344 to source 311. This causes the armature 328 to break circuit of lines 321—330 at opened contacts 329. The operative motions of the entry conveyor D are now completed which is then positioned at the lower limit of its swinging motion and in which position it is adapted to suitably receive a subsequent assembly from the delivery conveyor B. Also, the pressing-roll frame E will have been returned to the angular position in which it is best adapted to accept the leading end of the assembly between the pairs of rollers 214. Now, as the cam 283 completes one full revolution and the take-off conveyor F is returned to its position in a substantially horizontal plane to carry the completely pressed assembly S to the discharge conveyor C, a suitable cam 345 is adapted to close a switch 346. This switch from source line 321 completes a circuit through line 347 to the coil 348 of relay switch 334 and to source line 311 by line 349. This operates to move armature 336 to open contacts 337 thus breaking the circuit through lines 321—338 to the clutch contacts 308.

It will thus become apparent that the preliminary pressing of assemblies of glass sheets and a plastic interlayer can be repetitiously carried out in substantially automatically controlled cycles operation and that the conveyors, between which the pressing-roll frame is interposed, can be caused to function in synchronous motion with the said frame. This insures that the forward movement of a glass-plastic assembly along a predetermined path can be accurately controlled and, more particularly, that the leading end thereof will be received while moving along the plane of a line tangential to the pressing rolls; the frame will be swung to cause the pressing operation to be carried out by the exertion of pressure forces acting in planes normal to the surfaces of the moving assembly and that the trailing end will be passed from the pressing-roll frame as the assembly is supported on the take-off conveyor while said trailing end is moving in the plane of a line tangent to the pressing rollers.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. An apparatus for pressing together an assembly of curved glass sheets and a plastic interlayer and including a structural framework, a conveyor frame pivotally mounted on one end of the framework at its outer end and disposed in a downwardly inclined position, pairs of integral vertically disposed members located in substantially spaced relation from the transverse vertical axis of the framework, rotatable means carried by one pair of the vertically disposed members and operatively connected to the inner end of the conveyor frame, fluid means adapted to drive the rotatable means and to raise and sequentially lower the said frame at the inner end thereof, a source of power mounted on the said framework, a pair of shafts rotatably mounted on the ends of the conveyor frame, a substantially endless belt entrained about the pair of shafts to move a glass-plastic assembly along a predetermined path transversely disposed to the axis of curvature thereof, means operatively connecting at least one of the pair of shafts to the source of power, a rotatable cam actively associated with the fluid means to control the operation thereof, a second conveyor frame mounted on the opposite end of the framework at its outer end and disposed in a substantially horizontal position, rotatable means carried on the second of the pairs of vertically disposed members and operatively connected to the inner end of the second-named conveyor frame, fluid means adapted to drive the second-named rotatable means and to lower and sequentially raise the second-named conveyor frame at the inner end thereof, a pair of shafts rotatably mounted on the ends of the second-named conveyor frame, a substantially endless belt entrained about the shafts to move a glass-plastic assembly forwardly along a predetermined path transversely disposed to the axis of curvature thereof, means operatively connecting at least one of the pair of shafts on the second-named conveyor frame to the source of power, a rotatable cam actively associated with the second-named fluid means to control the operation thereof, a pair of axially parallel pressing rolls disposed in the transverse axis of the framework, a pivotally mounted frame for supporting the pair of pressing rolls disposed in an angular plane inclined to the horizontal and interposed between the inner ends of the first and second conveyor frames, means operatively connecting one of the pair of rolls to the source of power, operating means for swinging the frame sequentially forwardly and rearwardly between the first angularly inclined position and a second angularly inclined position, fluid means adapted to drive the operating means, a rotatable cam actively associated with the third-named fluid means to control the operation thereof, means operatively connecting the first and third-named cams to the source of power, and means operable by the third-named cam for operatively connecting the second-named cam to the source of power.

2. An apparatus for pressing together the sheets of a curved glass-plastic assembly comprising a pair of rotatable pressing rolls providing a confined passage therebetween, means mounting said rolls for swinging movement about a horizontal axis substantially parallel to the axis of curvature of said assembly, a first conveyor disposed forwardly of said rolls for moving the curved leading end of assembly toward said rolls along a path substantially transverse to an axis of curvature thereof, a second conveyor disposed rearwardly of said rolls for receiving said curved leading end of said assembly from between said rolls and moving the same away from said rolls along a path substantially transverse to an axis of curvature thereof, means for pivotally mounting the first conveyor on a substantially horizontal axis adjacent the end thereof remote from said pressing rolls whereby the inner end of the first conveyor can swing upwardly and downwardly, with said first conveyor being adapted to receive said assembly and to direct the curved leading end thereof to the confined passage between the pressing rolls when said first conveyor is in the lower position, a source of power, a control means for raising the inner end of said first conveyor to maintain support for the curved trailing end of the assembly as said assembly passes over said first conveyor and between said pressing rolls, said control means including a fluid valve, a rotatable cam for operating the valve, and means selectively connecting the source of power to the cam to cause rotation thereof.

3. An apparatus for pressing together sheets of a curved glass-plastic assembly as defined in claim 2, including means for pivotally mounting said second conveyor on a substantially horizontal axis adjacent the end thereof remote from said pressing rolls whereby the inner end of said second conveyor can swing upwardly and downwardly with said second conveyor being adapted to receive said curved leading end of said assembly from said confined passage between the pressing rolls when said second conveyor is in its raised position, a second control means for lowering the inner end of said second conveyor to maintain support for the curved trailing end of the assembly as said assembly is received on said second conveyor from between said pressing rolls, said second control means including a fluid valve, a rotatable cam for operating the valve, and means responsive to the movement of said assembly through said confined passage for selectively connecting the source of power to the last-named cam to cause rotation thereof.

4. An apparatus for pressing together sheets of a curved glass-plastic assembly as defined in claim 3, in which an operating mechanism including a third control means is provided for effecting swinging movement of the pressing rolls, a third rotatable cam operating said third control means, means actuated by the leading end of the glass-plastic assembly for operatively connecting the first and third named cams to said source of power to raise the first conveyor and start the swinging movement of the pressing rolls, means actuated by said third cam for connecting said second named cam to the source of power to lower the second conveyor when the first and third cams reach substantially a midpoint in the rotation thereof, means actuated by the first cam to disconnect said first and third cams from the source of power when the first conveyor and pressing rolls are returned to starting position, and means operated by the second cam for disconnecting said cam from said source of power when said second conveyor reaches its original raised position.

References Cited in the file of this patent

UNITED STATES PATENTS

| | | |
|---|---|---|
| 2,729,581 | Pascoe et al. | Jan. 3, 1956 |
| 2,825,671 | Langhart et al. | Mar. 4, 1958 |
| 2,831,791 | Downes et al. | Apr. 22, 1958 |
| 2,849,345 | Smith et al. | Aug. 26, 1958 |
| 2,893,905 | Makovic et al. | July 7, 1959 |